United States Patent
Nagakura

[19]

[11] Patent Number: 6,057,780
[45] Date of Patent: May 2, 2000

[54] METHOD OF WRITING INFORMATION IN ROM OF A RADIO PAGER

[75] Inventor: Tomio Nagakura, Tokyo, Japan

[73] Assignee: NEC Corporation, Tokyo, Japan

[21] Appl. No.: 08/370,222

[22] Filed: Jan. 9, 1995

Related U.S. Application Data

[63] Continuation of application No. 07/835,328, Feb. 14, 1992, abandoned.

[30] Foreign Application Priority Data

Feb. 14, 1991 [JP] Japan .................................. 3-042737

[51] Int. Cl.[7] ........................................................ H04B 7/00
[52] U.S. Cl. ........................................................ 340/825.44
[58] Field of Search ........................ 340/825.44; 455/38.1

[56] References Cited

U.S. PATENT DOCUMENTS

| | | | |
|---|---|---|---|
| 4,577,060 | 3/1986 | Webb et al. | 379/57 |
| 5,070,329 | 12/1991 | Jasinaki | 340/825.44 |
| 5,177,478 | 1/1993 | Wagai et al. | 340/825.44 |

FOREIGN PATENT DOCUMENTS

| | | |
|---|---|---|
| 0339861 | 11/1989 | European Pat. Off. . |
| 0360228 | 3/1990 | European Pat. Off. . |
| 0393794 | 10/1990 | European Pat. Off. . |
| 2068616 | 8/1981 | United Kingdom . |

OTHER PUBLICATIONS

Derwent Abstract Accession No. 84–227237/37, Class V21, GB,A 2136–181 (NECCORP) Feb. 24, 1984.

Derwent Abstract Accession No. 90–001311/01, Class WO2, WO5, EP,A, 347938 (Toshiba KK) Dec. 27, 1989.

*Primary Examiner*—Brian Zimmerman
*Attorney, Agent, or Firm*—Sughrue, Mion, Zinn Macpeak & Seas, PLLC

[57] ABSTRACT

A radio pager and a method of writing information necessary for communication in a ROM (Read Only Memory) of the radio pager by using a ROM writer. The ROM writer determines whether or not it is ready to communicate with the pager and, if it is ready, sends a type code request signal to a CPU incorporated in the pager. On receiving the type code request signal, the CPU sends a type code signal representative of the type of the pager to the ROM writer. In response, the ROM writer identifies the type of the pager and then writes information necessary for communication in the ROM of the pager.

8 Claims, 7 Drawing Sheets

METHOD OF WRITING INFORMATION IN ROM OF A RADIO PAGER

This is a Continuation of Application Ser. No. 07/835,328 filed on Feb. 14, 1992 now abandonded.

BACKGROUND OF THE INVENTION

The present invention relates to a radio pager and, more particularly, to a method which allows information necessary for communication to be readily written to a ROM (Read Only Memory) incorporated in a radio pager by using a ROM writer.

A radio pager, or simply pager, is extensively used today and has at least one ROM therein. Various kinds of information necessary for communication, e.g., an address assigned to the pager, a reception control method and the contents of standardized sentences are written to the ROM by use of a writing device usually referred to as a ROM writer. Since the reception system, for example, differs from one type of pager to another, each pager stores a type code representative of the type thereof in the ROM in advance. Specifically, the type code may be ASCII (American Standard Code for Information Interchange) code "5E" in the case of a numerical display type pager or ASCII code "7B" in the case of an alphabetical display type pager.

The problem with the conventional operation for writing information in the ROM of a pager by a ROM writer is that the type of the pager has to be inputted to the ROM writer each time since the ROM writer lacks a function of identifying the type. This makes the operation of the ROM writer troublesome and time-consuming.

SUMMARY OF THE INVENTION

It is, therefore, an object of the present invention to provide a radio pager and a method which allows one to write information in a ROM of the radio pager easily and rapidly by operating a ROM writer.

In accordance with the present invention, a method of writing information necessary for communication in a ROM of a radio pager to which a particular type code is assigned by using a ROM writer comprises the steps of confirming the connection of the pager and ROM writer, sending a type code request signal from the ROM writer to the pager, sending, in responce to the type code request signal, a type code signal representative of the particular type code from the pager to the ROM writer, causing the ROM writer to identify the type of the pager in response to the type code signal, and sending the information from the ROM writer to the ROM of the pager to thereby write the information in the ROM.

In accordance with the present invention, a particular type code is stored in a ROM of a radio pager beforehand and information necessary for communication is written to the ROM.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
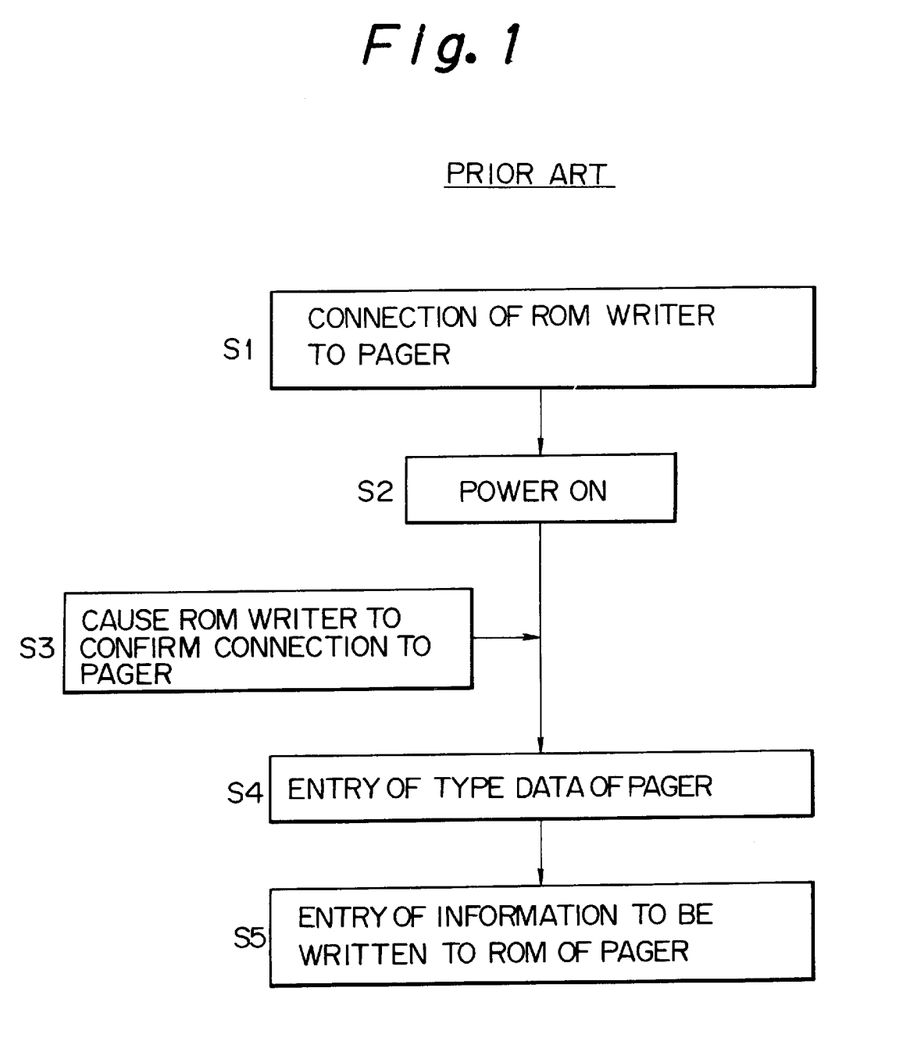
FIG. 1 is a flowchart demonstrating a conventional method of writing information in the ROM of a radio pager by use of a ROM writer.

Referring to FIG. 1 of the drawings, a conventional procedure for writing information necessary for communication in the ROM of a radio pager by use of a ROM writer is shown. As shown, a ROM writer is connected to a pager (step S1), and a power switch provided on the pager is turned on (S2). After the ROM writer has confirmed the connection thereof to the pager (S3), data representative of the type of the pager is inputted to the ROM writer (S4). Subsequently, various information necessary for communication, e.g., an address assigned to the pager, a reception control method and the contents of standardized sentences are inputted to the ROM via the ROM writer (S5). In this manner, the type data has to be entered on the ROM writer each time since the ROM writer cannot identify a type, resulting in troublesome and time-consuming operations.

A writing method embodying the present invention and free from the above-discussed problem will be described hereinafter.

Figure 2:
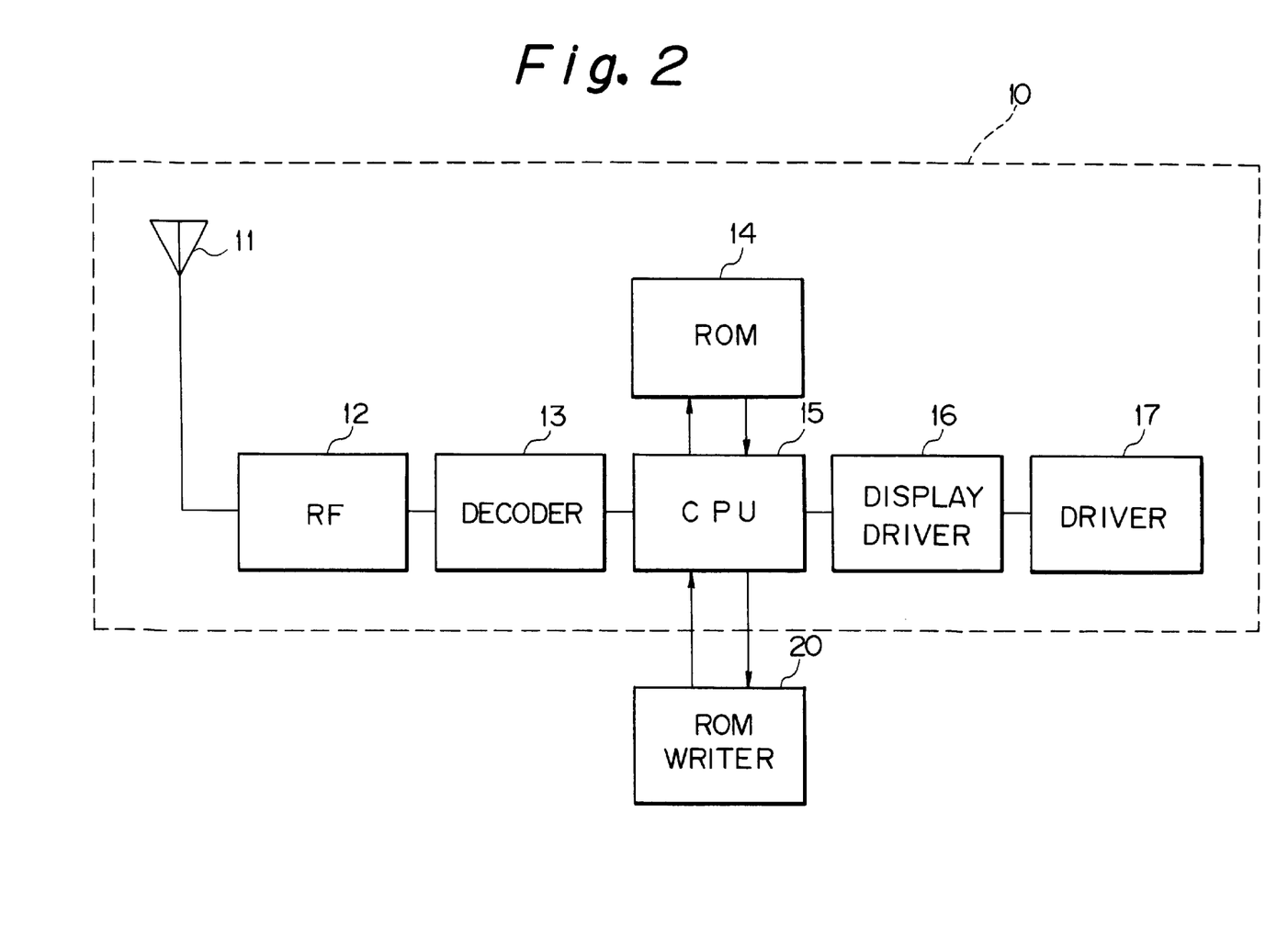
FIG. 2 is a block diagram schematically showing the construction of a radio pager to which a method of the present invention is applied, and a ROM writer connectable to the pager.

FIG. 2 shows a radio pager with a ROM to which the embodiment is applied, and a ROM writer connectable to the pager for writing information in the ROM. As shown, the pager, generally 10, has an antenna 11, an RF (Radio Frequency) section 12, a decoder 13, a ROM 14, a CPU (Central Processing Unit) 15, a display driver 16, and a display 17. A particular type code is assigned to the pager 10. A ROM writer 20 is connectable to the CPU 15 of the pager 10. The CPU 15 and the ROM writer 20 have respective connecting devices to confirm that they are ready to communicate with each other when connected. In addition, the ROM writer 20 has a type code requesting device and a type identifying device which will be described, while the CPU 15 has a type code sending device which will also be described.

In operation, a call signal come in through the antenna 11 of the pager 10 is amplified and demodulated by the RF section 12. The decoder 13 decodes the demodulated signal and applies the resulting signal to the CPU 15. The CPU 15 compares an address included in the decoded signal with an address assigned to the pager beforehand and read out of the ROM 14. If the two addresses are identical, the pager 10 starts on an alerting operation.

Figure 3:
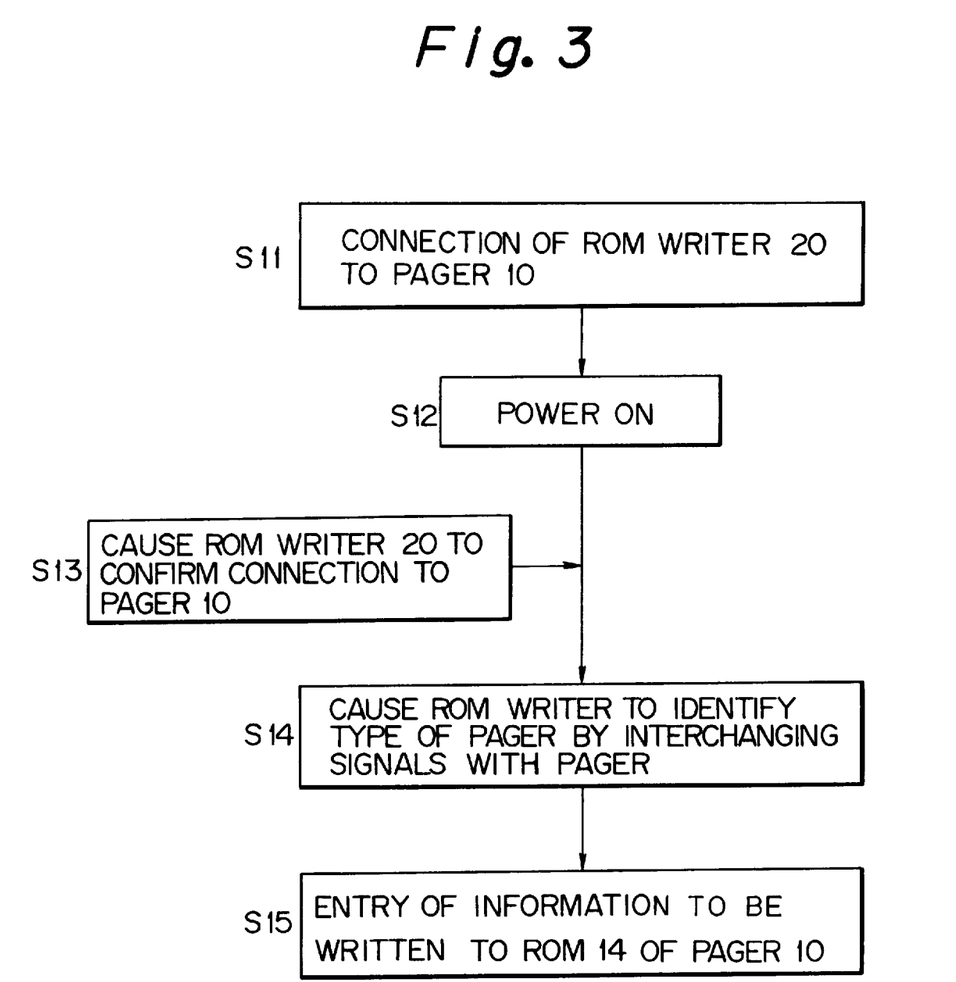
FIG. 3 is a flowchart representative of the method of the present invention.

FIG. 3 shows a sequence of steps for writing information in the ROM 14 by the ROM writer 20. As shown, after the ROM writer 20 has been connected to the pager 10 (S11), a power switch provided on the pager 10 is turned on (S12). As the ROM writer 20 confirms the connection thereof to the pager 10 (S13), it interchanges signals with the pager 10 to identify the type of the latter (S14). Subsequently, an address to be assigned to the pager 10, a reception control method, the contents of standardized sentences and other necessary information are inputted to the ROM 14 via the ROM writer 20 (S15). If the ROM writer 20 is not connected to the pager 10 as determined in the step 13, the pager 10 is brought to a standby state for awaiting a call signal.

Figure 4:
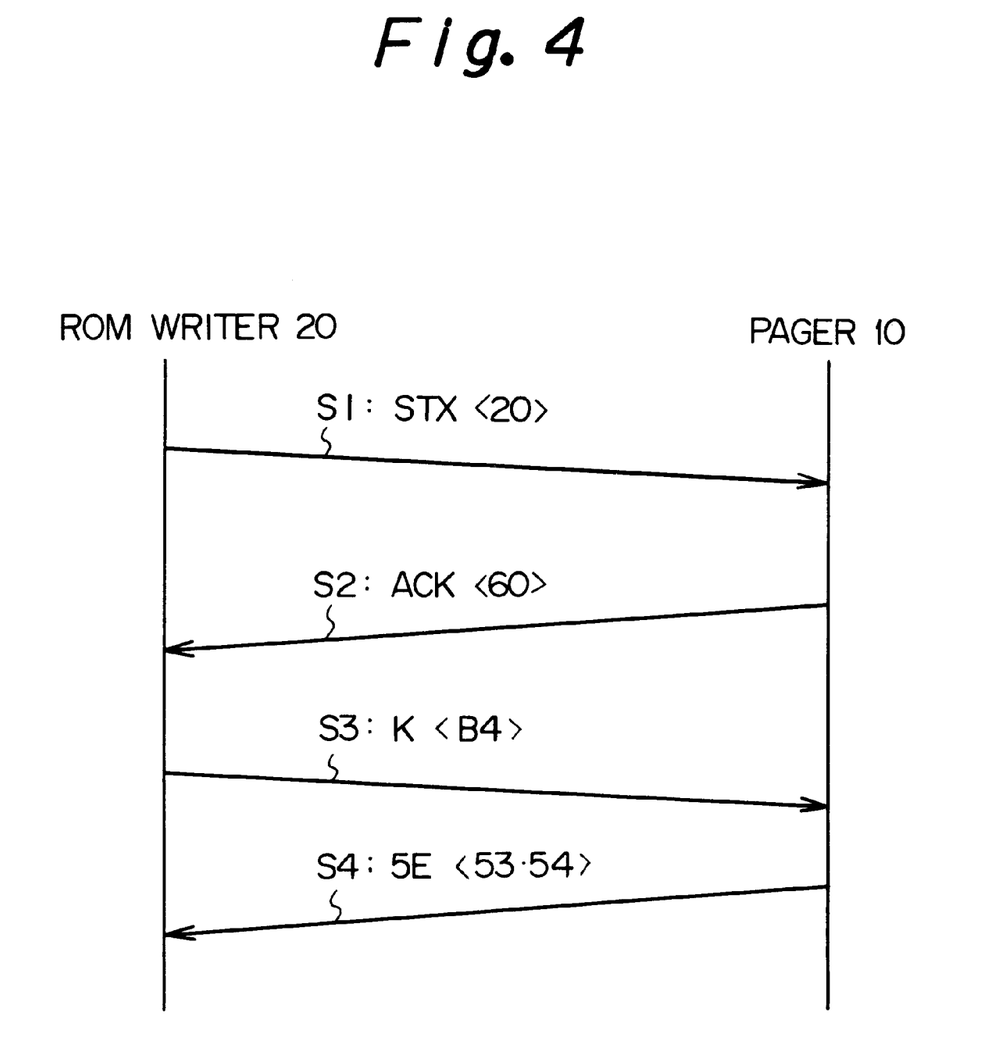
FIG. 4 shows a sequence in which the pager and ROM writer shown in FIG. 2 interchange signals.

The embodiment will be described more specifically with reference also made to FIG. 4 showing a sequence in which the pager 10 and the ROM writer 20 interchange signals with each other. When the connection of the pager 10 and ROM writer 20 is confirmed in the step 13, FIG. 3, the pager 10 starts on a ROM write mode operation and waits for a first predetermined code signal S1 from the ROM writer 20. Specifically, in the ROM write mode, the ROM writer 20 sends the first predetermined code signal Si, e.g., ASCII code STX (20) to the pager 10. The first predetermined code signal S1 functions to confirm connection between the ROM writer 20 and the pager 10 or to confirm readiness for writing information to the ROM 14. On receiving the signal S1, the pager 10 causes the CPU 15 thereof to send a second predetermined code signal S2, e.g., ASCII code ACK (60) to the ROM writer 20. In response to the second predetermined code signal S2, the ROM writer 20 determines that it can interchange information with the pager 10. Then, the ROM writer 20 sends a type code request signal S3, e.g., ASCII code K (B4) to the pager 10 from the previously mentioned type code requesting device thereof. On receiving this signal S3, the CPU 15 delivers a type code signal S4, e.g., ASCII code 5E (53, 54) to the ROM writer 20 from the previously mentioned type code sending device thereof. Subsequently, the type identifying device built in the ROM writer 20 as stated earlier determines the type of the pager 10 indicated by the type code signal S4. This is followed by the step S15, FIG. 3, for writing necessary information in the ROM 14 of the pager 10.

Figure 5A:
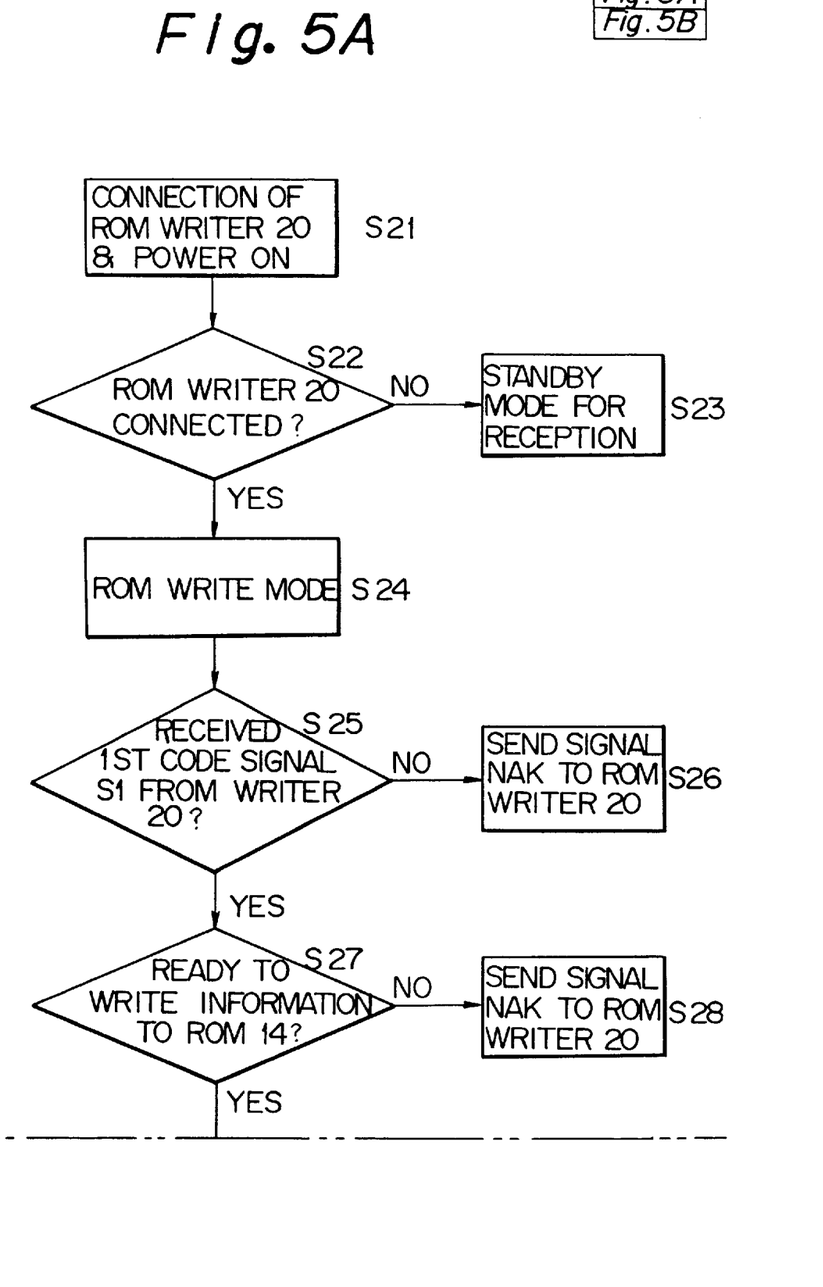
FIG. 5 is a flowchart representative of the operation of the pager shown n FIG. 2.
Figure 5B:
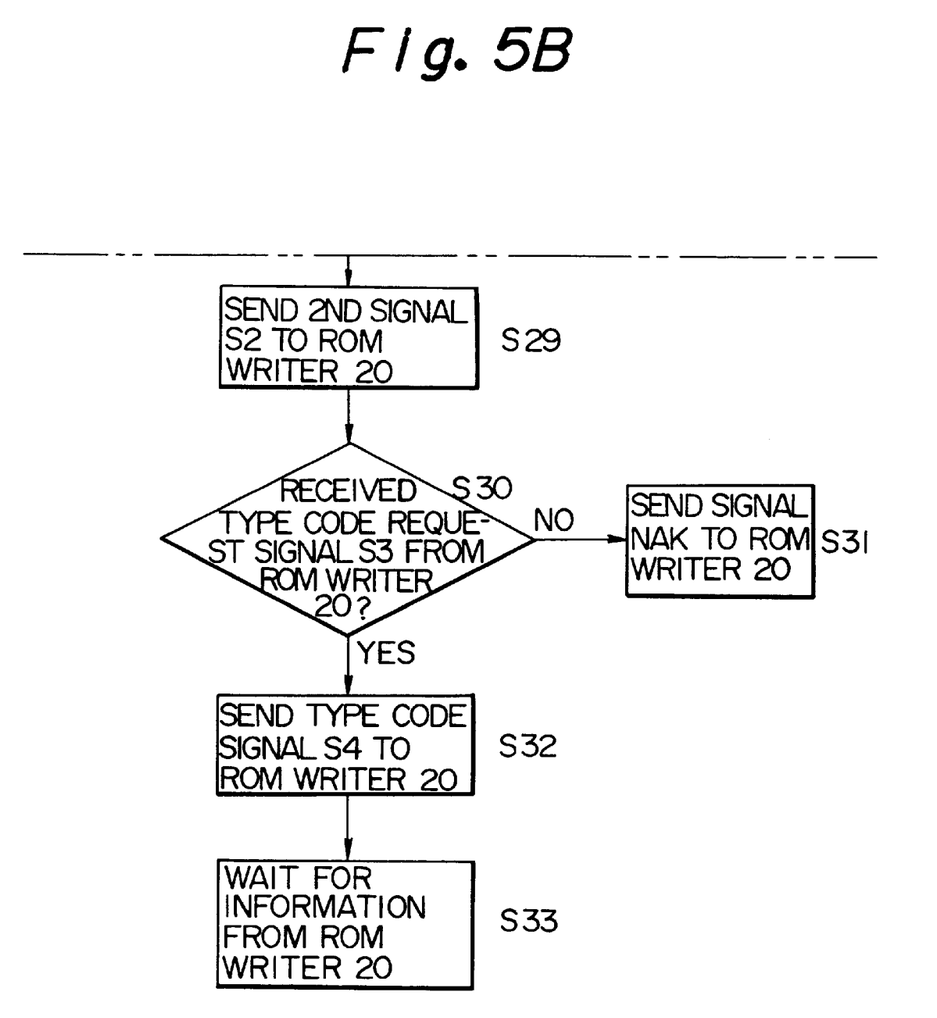
Figure 6:
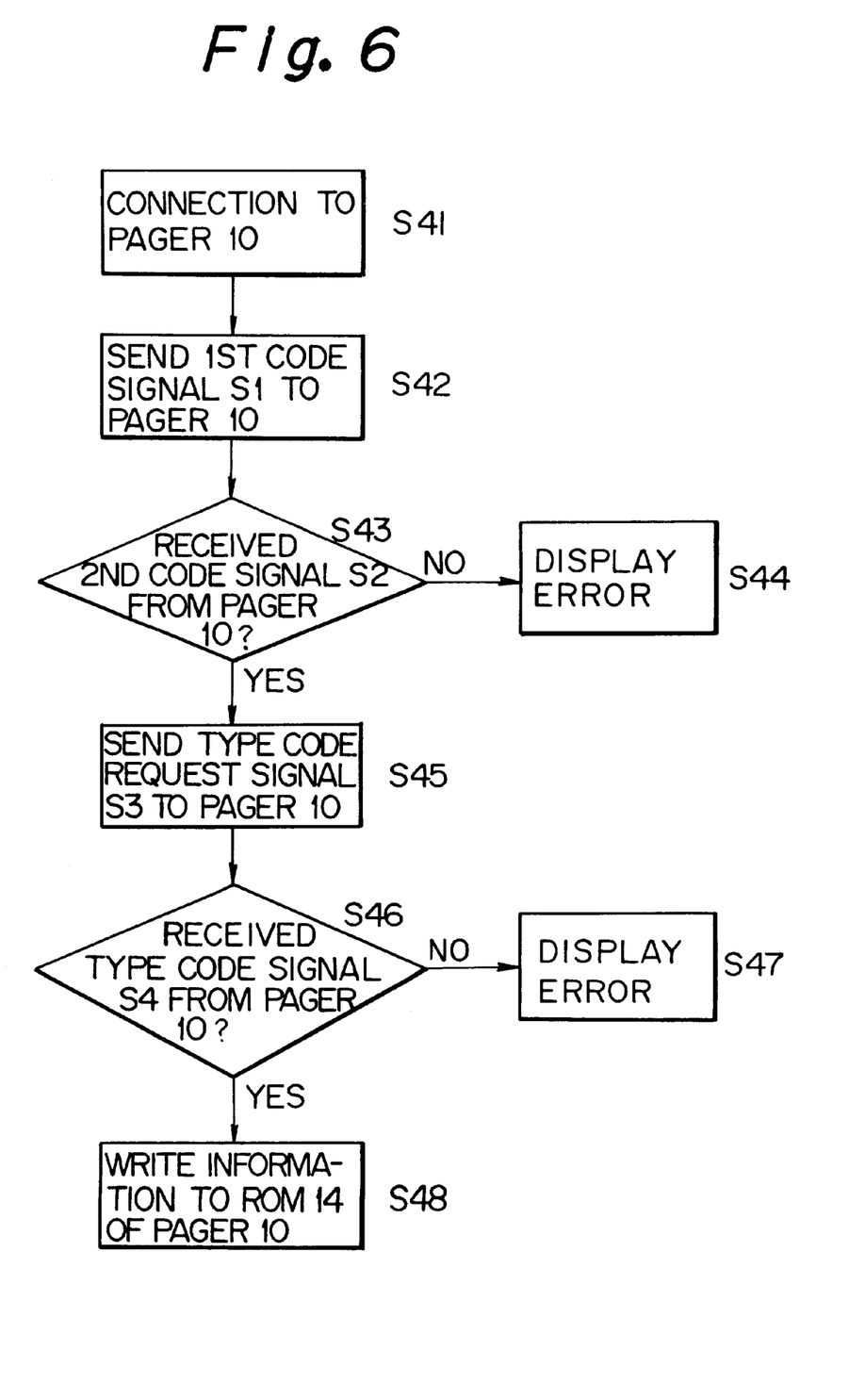
FIG. 6 is a flowchart representative of the operation of the ROM writer shown in FIG. 2.

FIGS. 5 and 6 show respectively the operation of the pager 10 and that of the ROM writer 20 for implementing the above-described information interchanging sequence.

First, the operation of the pager 10, i.e., CPU 15 included therein will be described with reference to FIG. 5. After the ROM writer 20 has been connected to the pager 10, the power switch of the pager 10 is turned on (S21). Then, the CPU 15 determines whether or not the ROM writer 20 is connected to the pager 10 (S22). If the answer of the step S22 is NO, the CPU 15 sets up a standby mode in which the pager 10 awaits a call signal (S23); if otherwise, it sets up the previously stated ROM write mode (S24). Thereafter, the CPU 15 determines whether or not the pager 10 has received the first predetermined code signal S1 from the ROM writer 20 (S25). If the pager 10 has not received the code signal S1 or has received a signal other than the code signal S1, the CPU 15 sends a signal NAK to the ROM writer 20 (S26). If the answer of the step S25 is YES, the CPU 15 determines whether or not the pager 10 is ready to write information in the ROM 14 (S27). If the pager 10 is ready to do so, the CPU 15 sends the second predetermined code S2 to the ROM writer 20 (S29); if otherwise, the CPU 15 sends a signal NAK to the ROM writer 20 (S28). After the step S29, the CPU 15 determines whether or not the pager 10 has received the type code request signal S3 from the ROM writer 20 (S30). If the pager 10 has not received the signal S3 or has received a signal other than the signal S3, the CPU 15 sends a signal NAK to the ROM writer 20 (S31). If the pager 10 has received the signal S3 as determined in the step S30, the CPU 15 sends the type code signal S4 to the ROM writer 20 (S32). Thereafter, the CPU 15 awaits information which will be sent from the ROM writer 20 to be written in the ROM 14 (S33).

As shown in FIG. 6, as the ROM writer 20 is connected to the pager 10 (S41), it sends the first predetermined code signal Si to the pager 10 (S42). Then, the ROM writer 20 determines whether or not it has received the second predetermined code signal S2 from the pager 10 (S43). If the ROM writer 20 has not received the signal S2 within a predetermined period of time or has received a signal NAK from the pager 10, it displays an error (S44). On receiving the signal S2 (YES, S43), the ROM writer 20 sends the type code request signal S3 to the pager 10 (S45). Subsequently, the ROM writer 20 determines whether or not it has received the type code signal S4 from the receiver 10 (S46). If the ROM writer 20 has not received the signal S4 from the pager 10 within a predetermined period of time or has received a signal NAK, it displays an error (S47). On receiving the signal S4 (YES, S46), the ROM writer 20 starts on an operation for writing necessary information in the ROM 14 of the pager 10 (S46).

In summary, it will be seen that the present invention provides a radio pager and a method which allows one to write various information necessary for communication in a ROM of the radio pager easily and rapidly by operating a ROM writer.

Various modifications will become possible for those skilled in the art after receiving the teachings of the present disclosure without departing from the scope thereof.

What is claimed is:

1. A method of writing information necessary for communication in a ROM of a radio pager to which a particular type code is assigned by using a ROM writer, comprising the steps of:

(a) storing in said ROM writer a single writing program for each of a plurality of types of radio pagers;

(b) electrically connecting said radio pager and said ROM writer;

(c) confirming the connection of said radio pager and said ROM writer;

(d) sending a type code request signal from said ROM writer to said radio pager via said electrical connection;

(e) sending, in response to said type code request signal, a type code signal representative of said particular type code from said radio pager to said ROM writer via said electrical connection;

(f) causing said ROM writer to identify the type of said radio pager connected thereto on the basis of said type code signal;

(g) causing said ROM writer to initiate said writing program corresponding to said type of said radio pager; and (h) sending said information from said ROM writer to said ROM of said radio pager to thereby write said information in said ROM.

2. A method as claimed in claim 1, wherein said type code is stored in said ROM of said radio pager beforehand.

3. A method as claimed in claim 1, wherein said information comprises said type code, an address assigned to said radio pager, a reception control method, and contents of standardized sentences.

4. A method as claimed in claim 1, wherein step (c) comprises setting up a ROM write mode in said radio pager after the completion of the connection of said radio pager and said ROM writer.

5. A method as claimed in claim 1, wherein said ROM writer further comprises type code requesting means for sending said type code request signal in step (d), and type identifying means for identifying the type of said radio pager in response to said type code signal in step (f).

6. A method as claimed in claim 1, wherein said pager displays an error when the connection of said radio pager and said ROM writer has not been confirmed within a predetermined period after first attempting to connect said radio pager and said ROM writer.

7. A radio pager system, comprising:
(a) a plurality of radio pagers, each of said radio pagers being one of a plurality of types;
(b) a ROM contained in each of said radio pagers for storing information necessary for communication, said ROM having a particular type code representative of a type of said radio pager stored therein beforehand;
(c) a ROM writer which stores a single writing program for each of said plurality of types of said radio pagers and, on determining the type of radio pager electrically connected thereto on the basis of a code representative of the type sent from the pager, initiates a writing program corresponding to said type.

8. A radio pager system as claimed in claim 7, wherein said type code is outputted from said ROM in response to a request signal external to said pager.

* * * * *

UNITED STATES PATENT AND TRADEMARK OFFICE
CERTIFICATE OF CORRECTION

PATENT NO. : 6,057,780
DATED : May 2, 2000
INVENTOR(S) : Tomio NAGAKURA

It is certified that error appears in the above-identified patent and that said Letters Patent is hereby corrected as shown below:

Column 3, line 7 delete "Si" insert --S1--
line 63 delete "Si" insert --S1--

Signed and Sealed this

Tenth Day of April, 2001

Attest:

NICHOLAS P. GODICI

Attesting Officer        Acting Director of the United States Patent and Trademark Office